(12) United States Patent
Schibur et al.

(10) Patent No.: US 11,047,122 B2
(45) Date of Patent: Jun. 29, 2021

(54) TOILET WITH VITREOUS CHINA FLUSH ENGINE AND POLYMERIC OUTER STRUCTURE

(71) Applicant: Kohler Co., Kohler, WI (US)

(72) Inventors: Mark W. Schibur, Sheboygan, WI (US); Clayton C. Garrels, Kohler, WI (US); Jeremiah J. Rauwerdink, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 15/985,597

(22) Filed: May 21, 2018

(65) Prior Publication Data

US 2018/0334789 A1 Nov. 22, 2018

Related U.S. Application Data

(60) Provisional application No. 62/509,588, filed on May 22, 2017.

(51) Int. Cl.
| | | |
|---|---|---|
| *E03D 11/02* | (2006.01) | |
| *B28B 1/26* | (2006.01) | |
| *B32B 27/08* | (2006.01) | |
| *B32B 5/18* | (2006.01) | |
| *B28B 1/16* | (2006.01) | |
| *E03D 5/012* | (2006.01) | |
| *E03D 5/10* | (2006.01) | |
| *E03D 11/18* | (2006.01) | |

(52) U.S. Cl.
CPC ............... *E03D 11/02* (2013.01); *B28B 1/16* (2013.01); *B28B 1/261* (2013.01); *B32B 5/18* (2013.01); *B32B 27/08* (2013.01); *E03D 5/012* (2013.01); *E03D 5/10* (2013.01); *E03D 11/18* (2013.01)

(58) Field of Classification Search
CPC ........... B28B 1/16; B28B 1/261; B32B 27/08; B32B 27/065; B32B 5/18; E03D 11/02; E03D 11/13; E03D 11/18
See application file for complete search history.

(56) References Cited

U.S. PATENT DOCUMENTS

| | | |
|---|---|---|
| 3,212,106 A | 10/1965 | Noel |
| 3,591,868 A | 7/1971 | Owens |
| | (Continued) | |

FOREIGN PATENT DOCUMENTS

| | | |
|---|---|---|
| CN | 101029499 | 9/2007 |
| CN | 101518428 | 9/2009 |
| | (Continued) | |

OTHER PUBLICATIONS

European Search Report re Application No. 18173473.2; 7 pages.
(Continued)

*Primary Examiner* — Erin Deery
(74) *Attorney, Agent, or Firm* — Lempia Summerfield Katz LLC

(57) ABSTRACT

A toilet assembly includes a flush engine having a bowl, a sump at a lower portion of the bowl, and a trapway extending from the sump. The toilet assembly further includes a first polymeric layer at least partially surrounding the flush engine, the first polymeric layer comprising a foam. The toilet assembly further includes a second polymeric layer provided on the first polymeric layer, the second polymeric layer comprising resin.

12 Claims, 12 Drawing Sheets

(56) References Cited

U.S. PATENT DOCUMENTS

| | | | |
|---|---|---|---|
| 3,816,234 A * | 6/1974 | Winfield | E04H 4/00 |
| | | | 428/317.9 |
| 3,843,977 A | 10/1974 | Garnett | |
| 4,086,318 A | 4/1978 | Garasi | |
| 4,145,772 A | 3/1979 | Whitney | |
| 4,160,295 A | 7/1979 | Putyra | |
| 4,209,862 A * | 7/1980 | Cortes-Garza | B32B 5/18 |
| | | | 4/584 |
| 4,237,934 A | 12/1980 | Gregory | |
| 4,983,443 A * | 1/1991 | Balmer | D06N 7/0007 |
| | | | 428/120 |
| 5,231,706 A | 8/1993 | Kendall | |
| 5,398,352 A | 3/1995 | Kordelin | |
| 5,502,845 A * | 4/1996 | Hayashi | E03D 11/02 |
| | | | 4/300 |
| 5,909,968 A | 6/1999 | Olin | |
| 6,212,700 B1 | 4/2001 | Giesler | |
| 7,325,781 B2 | 2/2008 | Parsons | |
| 7,353,577 B2 | 4/2008 | Davies | |
| 7,380,292 B1 | 6/2008 | Harris | |
| 8,191,182 B2 | 6/2012 | Mauduit | |
| 8,247,476 B2 | 8/2012 | Hajek et al. | |
| 8,528,123 B2 | 9/2013 | Hashem | |
| 8,536,254 B2 | 9/2013 | Hajek et al. | |
| 8,679,622 B2 | 3/2014 | Delong et al. | |
| 8,978,172 B2 | 3/2015 | Plate | |
| 9,021,620 B1 | 5/2015 | Walker | |
| 9,169,628 B2 | 10/2015 | Komorita | |
| 9,290,922 B2 | 3/2016 | Bernabei | |
| 9,321,897 B2 | 4/2016 | Kabeya | |
| 9,562,549 B2 | 2/2017 | McClure | |
| 9,596,961 B2 * | 3/2017 | Stokely | A47K 3/02 |
| 2004/0032749 A1 | 2/2004 | Schindler et al. | |
| 2007/0151011 A1 | 7/2007 | Brown | |
| 2013/0007953 A1 | 1/2013 | Niu | |
| 2015/0013056 A1 | 1/2015 | Seoul | |
| 2017/0043875 A1 | 2/2017 | Vervaet | |

FOREIGN PATENT DOCUMENTS

| | | | | |
|---|---|---|---|---|
| CN | 103362198 | | 10/2013 | |
| CN | 203267335 | | 11/2013 | |
| EP | 1464766 | | 10/2004 | |
| EP | 2090701 | | 8/2009 | |
| EP | 2189583 | | 5/2010 | |
| EP | 2537894 | | 12/2012 | |
| EP | 2 572 616 | | 3/2013 | |
| EP | 3075529 | | 10/2016 | |
| EP | 3 406 812 | | 11/2018 | |
| GB | 1541444 A | | 2/1979 | |
| JP | H1037279 A | * | 2/1998 | E03D 11/02 |
| JP | 2001327437 | | 11/2001 | |
| JP | 2004242802 | | 9/2004 | |
| JP | 2016147978 | | 8/2016 | |
| SE | 380856 B | | 11/1975 | |
| WO | WO 1996/025564 | | 8/1996 | |
| WO | WO 2008/024005 | | 2/2008 | |
| WO | WO 2011/054056 | | 5/2011 | |
| WO | WO-2013119844 A1 | * | 8/2013 | E03D 11/02 |

OTHER PUBLICATIONS

Chinese Office Action for Chinese Application No. 201810496110.X dated Aug. 11, 2020.

European Examination Report for European Patent Application No. 18 173 473.2-1002 dated Jul. 10, 2020.

* cited by examiner

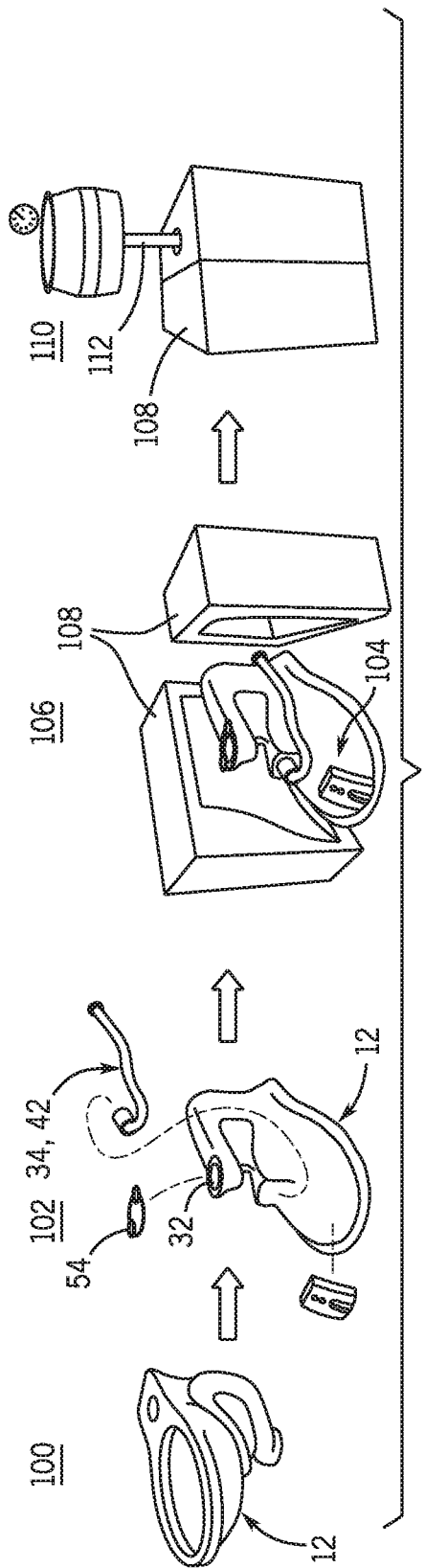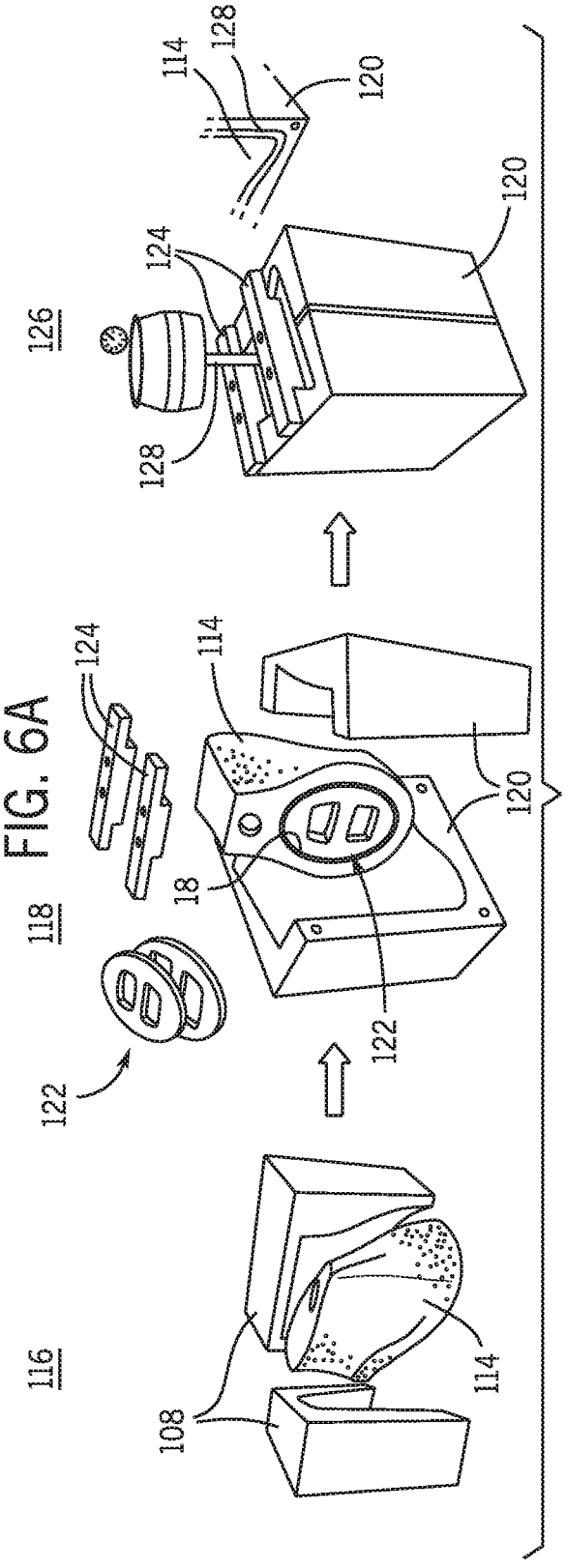

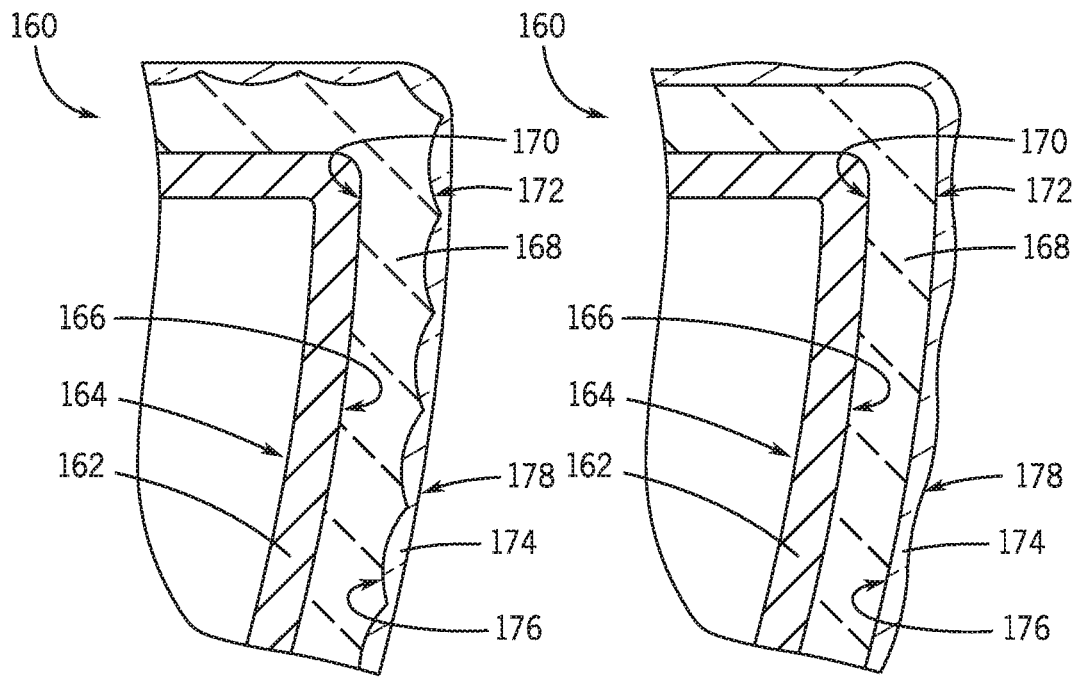
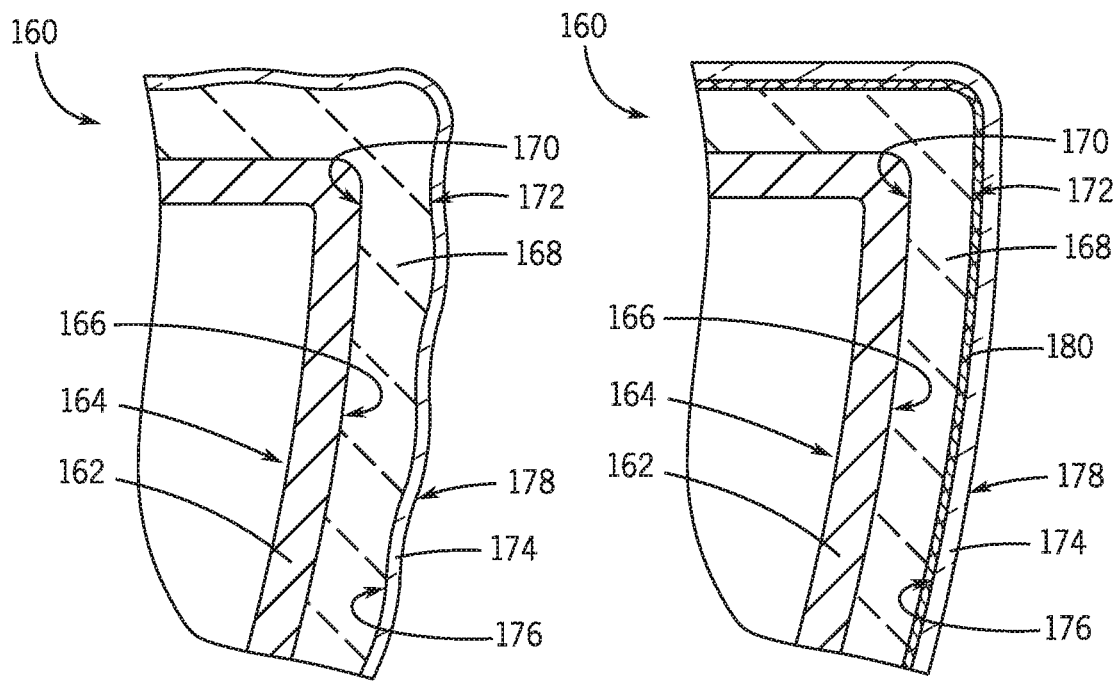

TOILET WITH VITREOUS CHINA FLUSH ENGINE AND POLYMERIC OUTER STRUCTURE

CROSS-REFERENCE TO RELATED APPLICATION

This application claims the benefit of and priority to U.S. Provisional Patent Application No. 62/509,588, filed May 22, 2017, the entire disclosure of which is incorporated herein by reference.

BACKGROUND

The present application relates generally to the field of toilets, and more specifically to toilet assemblies that include a glazed vitreous china flush engine having a polymeric outer structure overmolded or otherwise formed onto the flush engine.

Conventional floor-standing toilets include a pedestal or base that includes a bowl for containing water and waste prior to flushing. The toilet may optionally include a tank for containing flush water, which may either be integrally formed with the base or may be a separate component coupled to the base. The base also includes a sump and a trapway for routing the flush water from the bowl to the drain and various internal waterways that route water to the rim and/or sump of the toilet. Generally speaking, the entire base (including the bowl, sump, trapway, waterways, and any aesthetic features on the outer surface of the base) is cast from a vitreous china material in a single casting operation such that all of the components are integrally formed. Ensuring that the various waterways within the toilet are properly formed and provide the desired performance characteristics for the toilet presents a significant engineering challenge, and is the subject of extensive research and design efforts.

One challenge relates to the fact that each time a new toilet design is created (e.g., a new aesthetic design for the base), the entire flush engine for the toilet (i.e., the bowl, sump, and trapway) must be re-engineered and validated to ensure that it provides desired flow and other performance characteristics. One consequence of this is that it may take a relatively significant amount of time and cost to bring a new toilet design to market because of the engineering time and effort involved. This may also result in toilets of various aesthetic designs having different performance characteristics.

It would be advantageous to reduce the amount of time and effort required to design and manufacture a new toilet design. It would also be advantageous to provide an improved toilet design that may be produced in a more energy efficient manner than conventional toilets. These and other advantageous features will become apparent to those reviewing the present disclosure.

SUMMARY

One embodiment relates to a toilet assembly including a flush engine having a bowl, a sump at a lower portion of the bowl, and a trapway extending from the sump. The toilet assembly further includes a first polymeric layer at least partially surrounding the flush engine, the first polymeric layer comprising a foam. The toilet assembly further includes a second polymeric layer provided on the first polymeric layer, the second polymeric layer comprising resin.

Another embodiment relates to a plumbing fixture including a base structure having an inner surface comprising a sanitary surface configured to be in contact with waste water and an opposing outer surface. The plumbing fixture further includes a first polymeric layer disposed directly on the outer surface, the first polymeric layer comprising a foam. The plumbing fixture further includes a second polymeric layer provided on the first polymeric layer, the second polymeric layer comprising resin.

Another embodiment relates to a plumbing fixture including a base structure defining an opening therethrough and a functional insert fluidly coupled a water supply to the base structure at the opening. The plumbing fixture further includes a foam layer disposed directly on the base structure and a resin layer disposed on the foam layer. The functional insert is disposed in the foam layer.

Another embodiment relates to a toilet assembly that includes a pre-formed flush engine that includes a bowl, a sump at a lower portion of the bowl, and a trapway extending from the sump to a drain outlet. One or more polymeric materials at least partially surround the flush engine and may, for example, provide both functional structure (e.g., the rim of the toilet) and aesthetic features (e.g., the external design of the toilet, such as the pedestal design, etc.). In other words, the polymeric materials are a "shell" or "shroud" that conceals portions of the flush engine other than the bowl. According to other exemplary embodiments, the polymeric materials include a foam layer formed around the flush engine and a resin layer formed over the foam layer.

In one aspect of the embodiment, the toilet assembly further includes the epoxy foam layer formed around at least one of a rim supply line or a sump supply line.

Another embodiment relates to a method of forming a toilet assembly, including providing a pre-formed flush engine and inserting the flush engine into a first mold, the first mold defining a first shape substantially similar to and smaller than an outer shape of the toilet assembly. The method further includes injection molding a polymeric material (e.g., an epoxy or other foam) around the flush engine to form a foam subassembly. The method further includes removing the foam subassembly from the first mold and inserting the foam subassembly into a second mold, the second mold defining a second shape substantially the same as the outer shape of the toilet assembly. The method further includes injection molding a resin around the foam subassembly to form the completed toilet assembly. The method further includes removing the toilet assembly from the second mold.

In one aspect of the embodiment, the method further includes polishing the toilet assembly.

Features such as waterways may be separately formed and inserted into the mold prior to the injection molding processes so that the waterways are molded in place relative to the vitreous flush engine.

BRIEF DESCRIPTION OF THE DRAWINGS

FIG. 6A is a schematic of a portion of a process for forming the toilet assembly.

FIG. 6B is a schematic of another portion of the process in FIG. 6A.

FIG. 14 is a cross-sectional view of a plumbing fixture according to an exemplary embodiment.

FIG. 15 is a cross-sectional view of a plumbing fixture according to another exemplary embodiment.

FIG. 16 is a cross-sectional view of a plumbing fixture according to another exemplary embodiment.

FIG. 17 is a cross-sectional view of a plumbing fixture according to another exemplary embodiment.

DETAILED DESCRIPTION

According to an exemplary embodiment, a toilet includes a pre-formed flush engine (including, for example, a bowl, sump, and trapway) that is provided within a surrounding shell (e.g., shroud, pedestal, cover, etc.) formed of a polymeric material. Waterways and other features may be coupled to the flush engine and secured in place by the polymeric material. One advantageous feature of such a configuration is that it allows for reduced development costs for new toilet designs by using a separate standardized flush engine and waterway structure while giving designers freedom to create an external structure that may have varying aesthetic designs. In other words, rather than re-engineering a flush engine each time a new aesthetic design is created, one can simply design the shell and apply it to a standard flush engine, significantly reducing the amount of engineering effort required and reducing the time to market.

Figure 1:
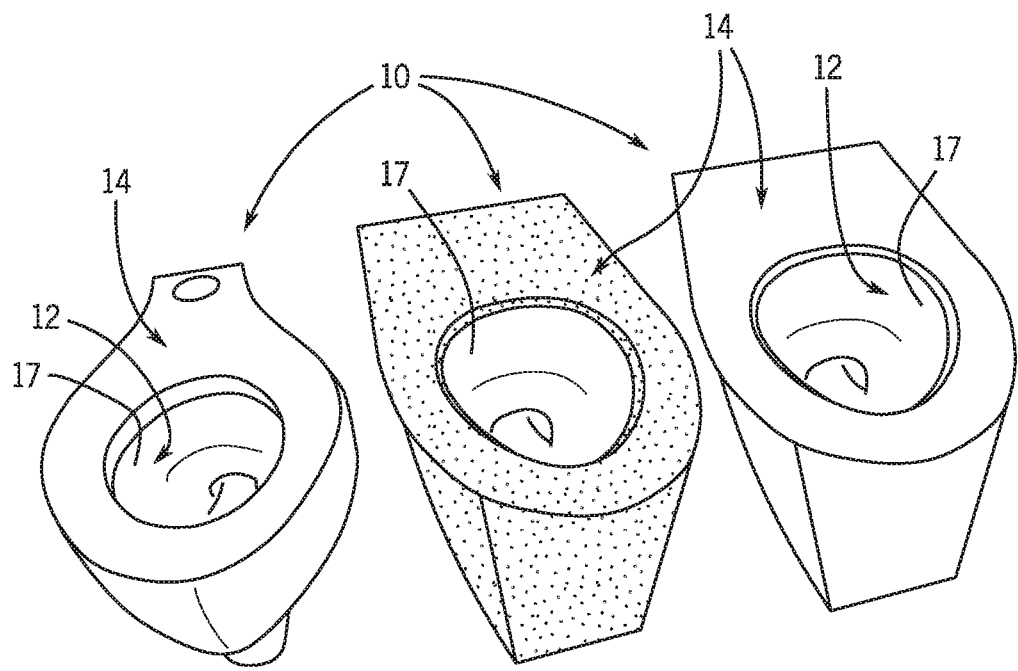
FIG. 1 shows various embodiments of toilet assemblies.

Referring to FIG. 1, toilet assemblies 10 are shown according to various exemplary embodiments. The toilet assembly 10 includes a flush engine 12 separately formed from and disposed within a shell 14 (e.g., housing, skin, etc.) that is formed of one or more polymeric materials that are over-molded directly onto or otherwise secured to an outer surface of the flush engine 12, as will be described in greater detail below. For example, the shell 14 may be formed from two layers, including a foam inner core (e.g., an epoxy foam or other foams), generally defining the outer shape of the toilet assembly 10, and a resin outer layer disposed on the foam layer, providing a desired surface appearance. According to various exemplary embodiments, the layers may be formed from materials, including epoxy resin (e.g., bisphenol A, bisphenol F, novolac, aliphatic, glycidylamine, etc.), adhesives, elastomers, or polymers (e.g., nylons, polyethylene, polypropylene, polystyrene, polyurethane, polyvinyl chloride, etc.) Although the three toilets shown in FIG. 1 have different external aesthetic designs, including at least shape and color, they may share a common flush engine design.

Figure 2:
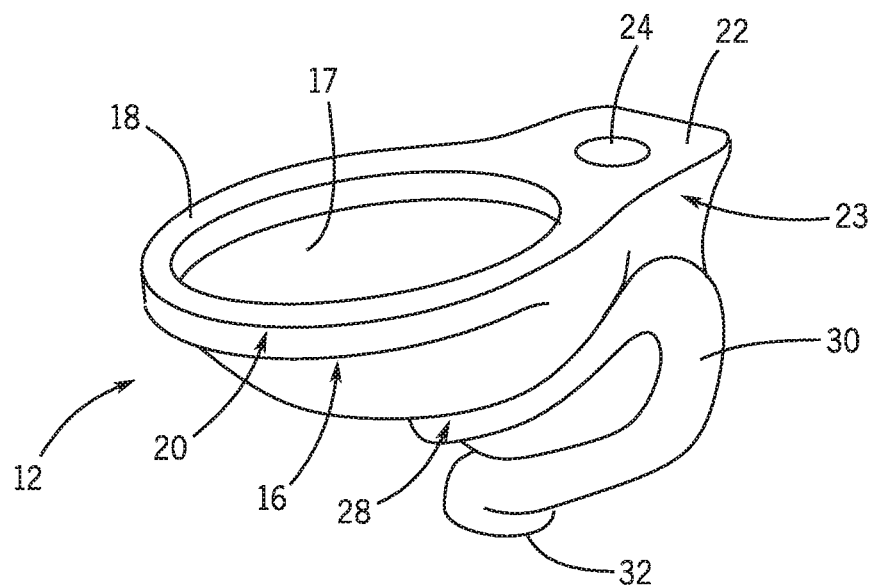
FIG. 2 shows a pre-formed flush engine.

Referring to FIG. 2, a drawing of such a flush engine (here referred to again as flush engine 12) is shown according to an exemplary embodiment. The flush engine 12 is formed form vitreous china according to one exemplary embodiment. The flush engine 12 includes a bowl 16 having a rim 18 (e.g., an upper surface) at an upper edge 20 of the bowl 16. The bowl 16 includes an inner surface 17. The flush engine 12 further includes a sump 28 at a lower portion of the inner surface 17 of the bowl 16 and a trapway 30 extending downstream from the sump 28 and defining a drain outlet 32 configured to be fluidly coupled to a drain when the toilet assembly 10 is installed in a bathroom.

The flush engine 12 includes a substantially flat (e.g., planar) upper surface 22, having an edge 23 formed at an outer periphery of the upper surface 22. When the toilet assembly 10 includes a tank (not shown) for providing water to the inner surface 17 of the bowl 16, the upper surface 22 may define an inlet opening 24 configured to receive water from the tank and deliver the water to a flush opening or openings 26 formed in the bowl 16 proximate the rim 18. Similarly, in a configuration without a tank, a flush valve (not shown) may be fluidly coupled to the inlet opening 24 for providing water to the inner surface 17 of the bowl 16. According to another exemplary embodiment, the toilet assembly 10 is configured to be connected to a wall carrier (e.g., for a wall-mounted toilet). In this configuration, the upper surface 22 may not include an inlet opening 24.

The flush engine 12 is formed from vitreous china or other suitable sanitary material. For example, according to other exemplary embodiments, the flush engine 12 may be formed from a polymer, metal, or composite or from multiple components having different materials and assembled into a single flush engine assembly. The sanitary material is configured to engage waste and waste water and be easily cleanable and resilient to cleaning chemicals. In a conventional toilet, after the toilet is cast and assembled, both the inner and outer surfaces of the entire toilet are glazed and certain treatments may be applied to the surface of the bowl and/or trapway to provide desired performance characteristics (e.g., anti-staining or other coatings may be applied).

Unlike conventional fully-glazed toilets, however, the toilet embodiments of the present application may include glazing on only a portion of the toilet, which is exposed to waste during a flush sequence. While FIGS. 1 and 2 show the inner surface 17 of the bowl 16, it should be understood that the sump 28 and the trapway 30 are fluidly connected to the bowl 16 and similarly define inner surfaces extending from the inner surface 17 of the bowl 16, and collectively, forming an inner surface of the flush engine 12. In particular, the bowl 16, sump 28, and trapway 30 may be integrally formed, such that the inner surface of the flush engine 12 forms a smooth continuous surface extending through each of the bowl 16, sump 28, and trapway 30.

In the configurations shown in FIGS. 1 and 2, only an inner surface of the flush engine 12 is glazed, since the rest of the flush engine is concealed by the shell 14 and does not experience the same use conditions as the rest of the toilet. In this configuration, after the flush engine 12 is cast, the inner surface 17 of the bowl 16, the inner surface of the trapway 30, and/or the inner surface of a passage fluidly connecting the inlet opening 24 to the bowl 16 are glazed and the rest of the flush engine 12 (e.g., outer surfaces) may remain unglazed. The unglazed outer surfaces of the flush engine 12 may include the upper surface 22, an outer surface of the bowl 16, and/or an outer surface of the trapway 30. By only glazing an inner surface of the flush engine 12, the material and energy costs associated with glazing a toilet may be significantly reduced.

Figure 3:
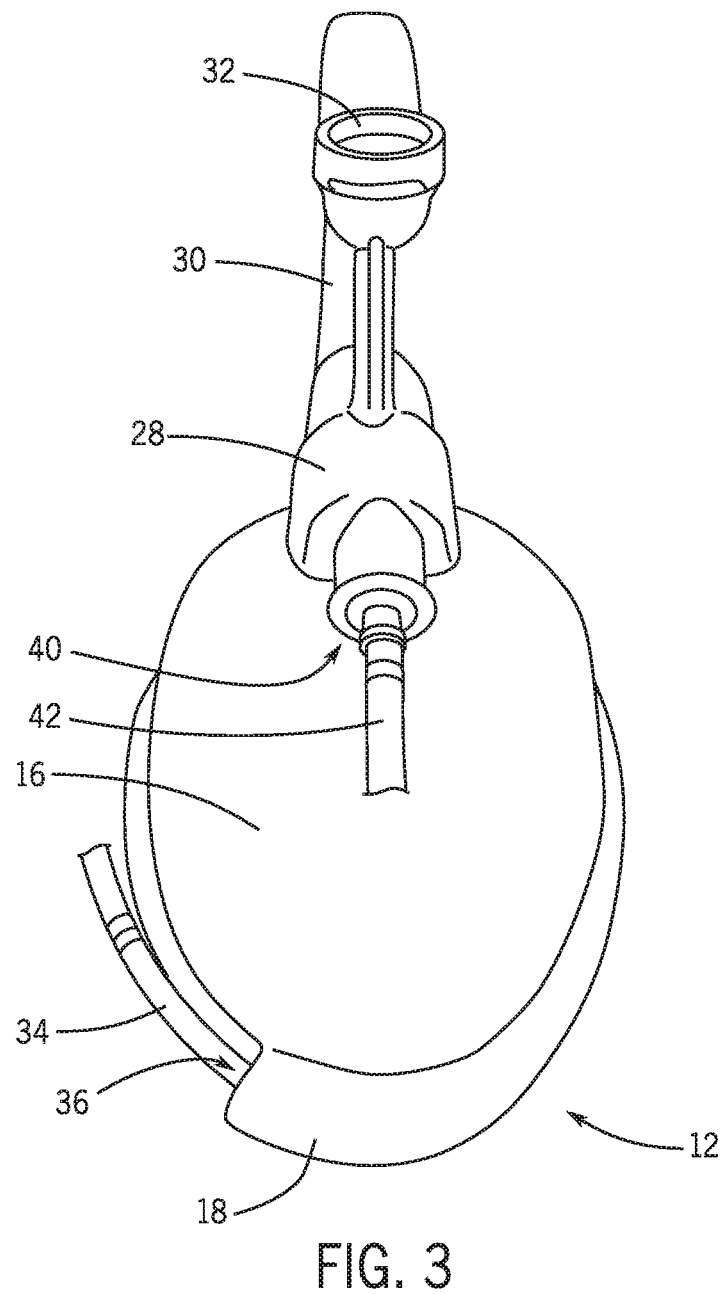
FIG. 3 is a bottom perspective view of a flush engine, according to an exemplary embodiment.
Figure 4:
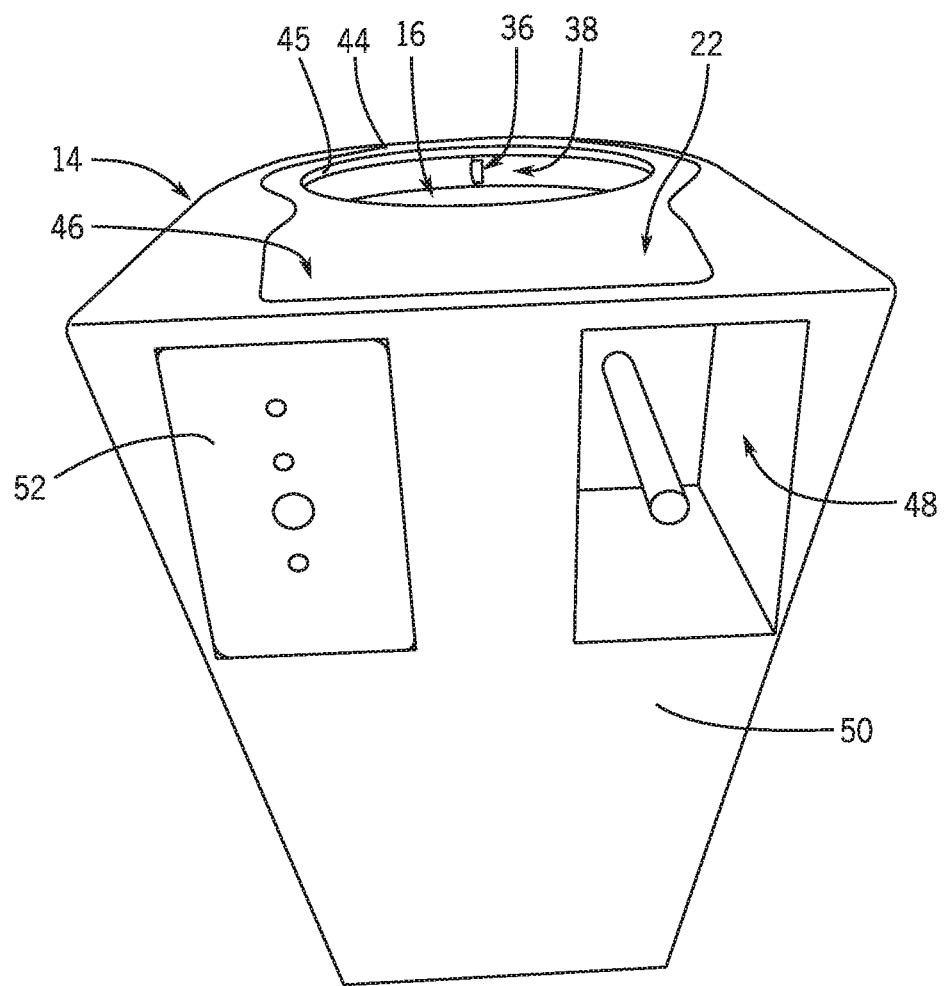
FIG. 4 shows a vitreous bowl with an integrally-formed flush ring.

Referring now to FIG. 3, the flush engine 12 is shown according to an exemplary embodiment. The flush engine 12 includes a rim supply line 34 fluidly coupled to or received in a rim opening 36 formed proximate the rim 18 and extending through the bowl 16 from the outer surface to the inner surface 17. The rim supply line 34 is configured to receive water from a water source and supply the water to the bowl 16 during a flushing sequence. Referring to FIG. 4, the bowl 16 is shown defining a channel 38 formed proximate the upper edge 20 of the bowl 16. The channel 38 is configured to introduce water to the bowl 16, such that the water generates a vortex for passing waste through the sump 28 and into the trapway 30. For example, introduction of water through the rim opening 36 may raise the water level in the bowl 16 until a siphon is generated, thereby evacuating the contents of the bowl 16. While FIG. 4 shows a channel 38, according to other exemplary embodiments, water may be introduced to the bowl 16 at the rim 18 in other ways. For example, the rim 18 may define a passage that is generally enclosed and defines a plurality of openings for introducing water to the bowl 16. The passage may be integrally formed with the rest of the flush engine 12 or may be separately formed from the flush engine 12 and subsequently coupled to the flush engine 12. The passage may also be formed from vitreous china or may be formed from plastic or other suitable material (e.g., a plastic tube or conduit that is molded within the assembly and secured in place by the shell.

Referring again to FIG. 3, the rim supply line 34 may be formed from a plastic, PEX, or other suitable flexible material. The rim supply line 34 may be received in the rim opening 36 with a gasket (e.g., o-ring) disposed between the rim supply line 34 and the rim opening 36, such that the rim supply line 34 sealingly engages the rim opening 36. Furthermore, the sealed engagement prevents polymeric material (e.g., foam, resin, or other materials) from entering into the rim 18 through the rim opening 36 during an injection molding process, as will be described in further detail below. According to another exemplary embodiment, the rim supply line 34 may be formed as a hollow core in the shell 14.

Still referring to FIG. 3, the flush engine 12 may further define a sump opening 40 at a forward portion of the sump 28. A sump supply line 42 is received in the sump opening 40 and is configured to receive water from the water source and supply the water to the sump 28. For example, in a wash-down toilet, water may be supplied to the sump 28 during a flushing cycle in order to evacuate the contents from the bowl 16. Similarly to the rim supply line 34, the sump supply line 42 may be formed from a plastic, PEX, or other suitable flexible material. The sump supply line 42 may be received in the sump opening 40 with a gasket (e.g., o-ring) disposed between the sump supply line 42 and the sump opening 40, such that the sump supply line 42 sealingly engages the sump opening 40. Furthermore, the sealed engagement prevents polymeric material (e.g., foam, resin, or other materials) from entering into the sump 28 through the sump opening 40 during an injection molding process. According to another exemplary embodiment, the sump supply line 42 may be formed as a hollow core in the shell 14.

Referring to FIG. 4, the shell 14 defines a forward portion 44, configured to house the bowl 16 and a rear portion 46 configured to face a wall in a bathroom when the toilet assembly 10 is installed. The forward portion 44 defines a bowl opening 45 corresponding to the rim 18 of the bowl 16. The rear portion 46 defines one or more cavities 48 formed in a rear surface 50 of the shell 14. As shown in FIG. 4, the rim supply line 34 and/or the sump supply line 42 may extend out from the shell 14 at the cavities 48. A cover 52 may be sized to be received in each cavity 48 to at least partially enclose the components housed in the cavity 48. According to an exemplary embodiment, at least one cavity 48 may house electronic components (e.g., junction box) or controls.

Figure 5:
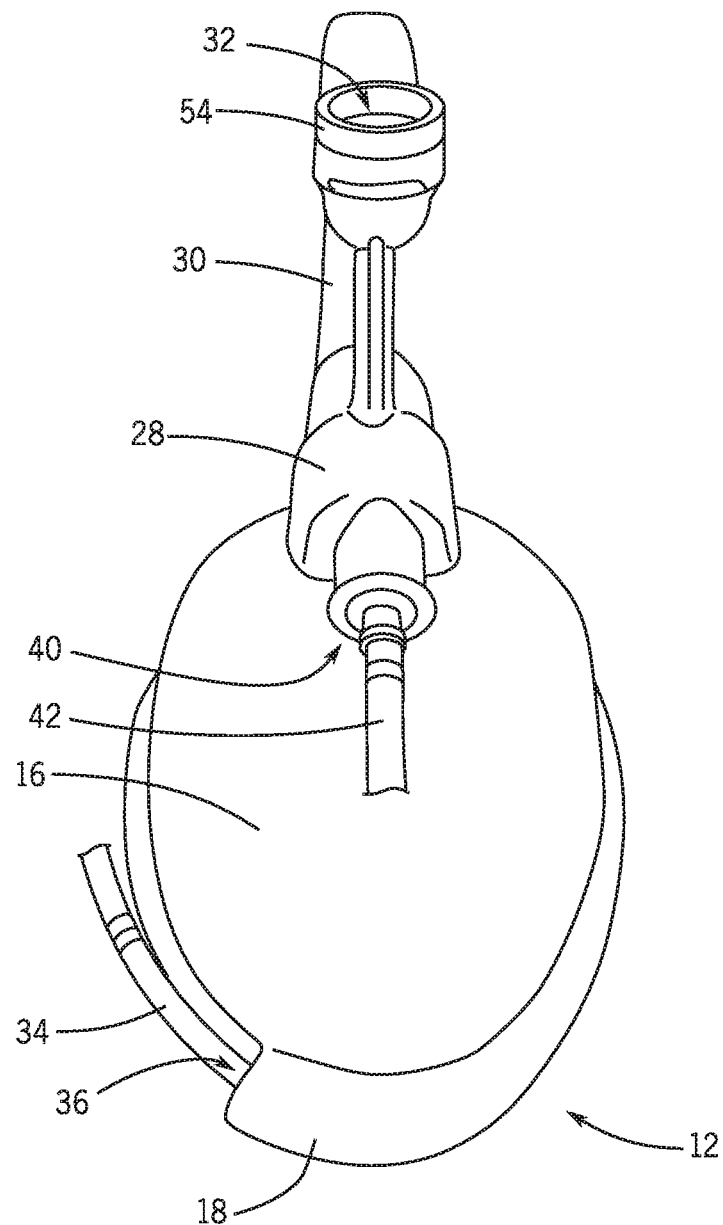
FIG. 5 is a bottom plan view of the flush engine of FIG. 3, with a mounting bracket installed.

Referring now to FIG. 5, the flush engine 12 is shown with a mounting flange 54 (e.g., a connector) disposed on the drain outlet 32 of the trapway 30. The mounting flange 54 is coupled to the drain outlet 32 and is configured to be coupled to a corresponding drain in a bathroom. For example, the mounting flange 54 is configured to provide a sealing connection between the drain outlet 32 and the drain, such that leakage of waste from the drain outlet 32 is limited or prevented. According to an exemplary embodiment, the mounting flange 54 may be a gasket received between the drain outlet 32 and the floor of a bathroom.

Figure 6C:
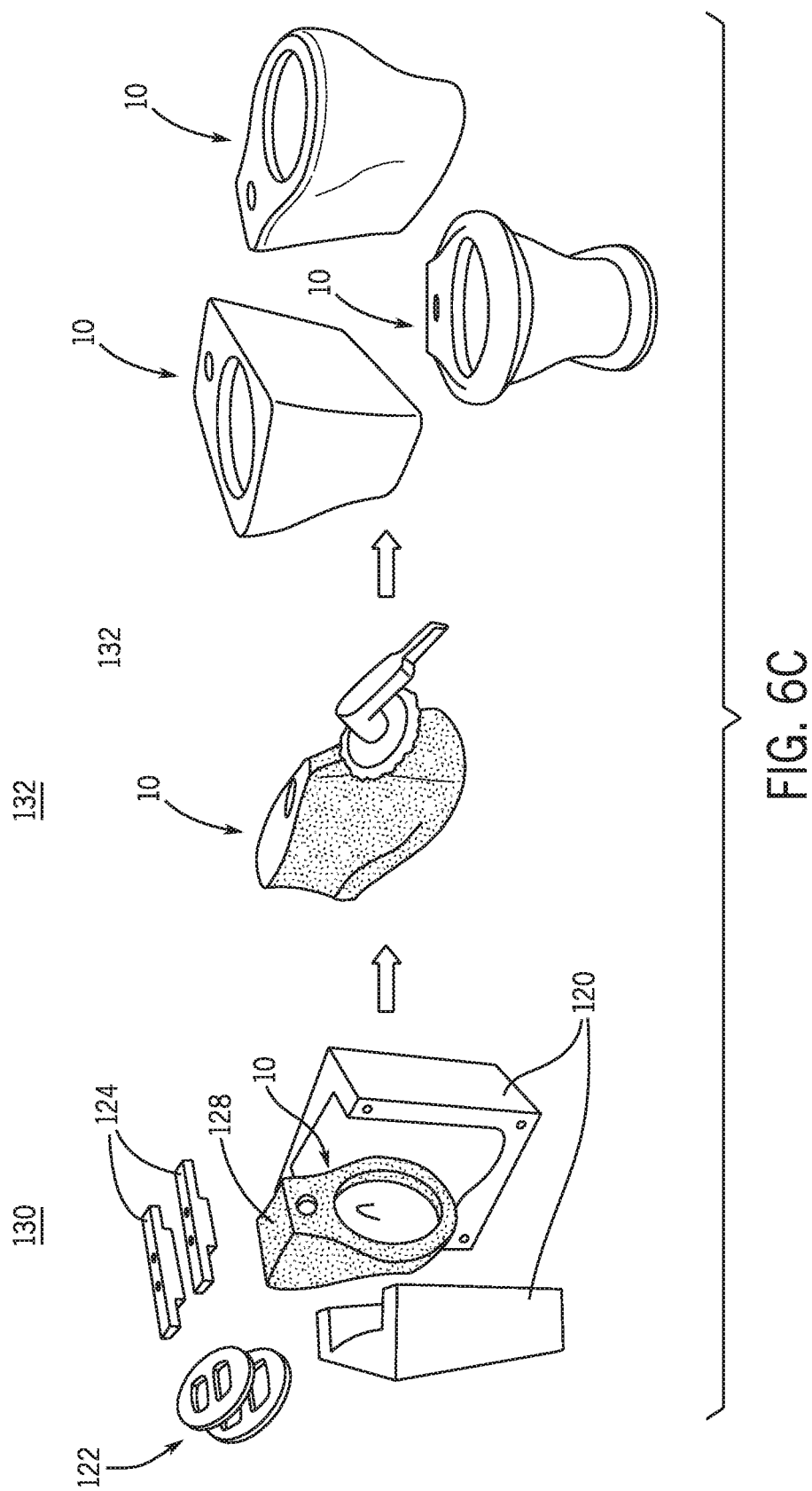
FIG. 6C is a schematic of another portion of the process in FIGS. 6A and 6B.

Referring now to FIGS. 6A-6C, one non-exclusive exemplary method of forming the toilet assembly 10 is shown according to an exemplary embodiment. Referring to FIG. 6A, in a first step 100, the flush engine 12 is cast from vitreous china. As discussed above, the inner surfaces of the bowl 16 and the trapway 30 are glazed while the outer surfaces remain unglazed. According to another exemplary embodiment, the flush engine 12 is pre-formed in other ways (e.g., injection molded, stamped, assembled, etc.) or from other materials (e.g., polymer, metal, composite, etc.).

In a second step 102, functional inserts are installed on or proximate to the flush engine 12 to form a flush engine subassembly 104. Functional inserts may include plumbing (e.g., the rim supply line 34, the sump supply line 42, etc.), the mounting flange 54, and other components. For example, various electronic components may be installed on or proximate to the flush engine 12 for integral molding within the shell 14. Such electronic components may include lighting (e.g., led light strips), sensors (e.g., proximity sensors, touch sensors, light sensors, etc.), wiring, and/or other components. For other plumbing or sanitary fixtures formed using the method shown in FIG. 6, the functional inserts may include other flexible or rigid tubes, hoses, or conduits, which fluidly connect a water supply to an inner surface of a base structure of the plumbing or sanitary fixture through a corresponding opening in the base structure. A gasket is disposed between the functional insert and the corresponding opening similarly to the with the rim supply line 34 and the sump supply line 42, as described above, such that foam does not pass between the functional insert and the corresponding opening.

In a third step 106, the flush engine subassembly 104 is placed within a first mold 108. The first mold 108 is a female mold configured to receive the flush engine subassembly 104 therein. The first mold 108 may include male portions corresponding with the cavities 48 in order to provide access to the functional inserts after the molding process. While the third step 106 shows the flush engine subassembly 104 being inserted into the first mold 108 with functional inserts installed, according to another exemplary embodiment, the first mold 108 includes additional male portions that extend from the rim opening 36 and/or the sump opening 40 to corresponding cavities 48 to form a conduit in the molding process. In this configuration, the second step 102 may be skipped or may be performed after the third step 106, such that the functional inserts are installed through the voids formed in the third step 106 by the male portions of the first mold 108.

The first mold 108 defines a first shape similar to but smaller than a desired finished outer shape of the toilet assembly 10. Because the toilet assembly 10 is injection-molded, this desired shape is not limited by conventional vitreous casting requirements, providing much broader flexibility in final toilet design (e.g., the ability to form much sharper edges and more defined features than would be possible in a conventional vitreous china casting process). The first mold 108 is further configured to completely cover and enclose the bowl 16 at the upper edge 20, such that foam does not enter the bowl 16 during the molding process. For example, the upper surface 22 of the flush engine 12 may be disposed directly against an inner surface of the first mold 108, such that the foam is prevented from contacting the upper surface 22 and entering the bowl 16 when introduced into the first mold 108. As shown in FIG. 6, the flush engine subassembly 104 may be oriented upside down (e.g., with the bowl 16 facing down and the drain outlet 32 facing up), although the flush engine subassembly 104 may be oriented in other directions in the first mold 108 according to other exemplary embodiments.

In a fourth step 110, the first mold 108 is closed and a first polymeric material 112 (e.g., a foam) is injected into the female portion of the first mold 108 under pressure, such that the first polymeric material 112 completely fills in the first mold 108 around the flush engine 12. The first polymeric material 112 may be a polystyrene (e.g., polyester), urethane, acrylic, or other suitable epoxy material configured to cure as a solid rigid enough to support the flush engine 12. As shown in the fourth step 110, the first polymeric material 112 cures until it is hardened and forms a subassembly 114. For example, where an epoxy foam is used for the first polymeric material 112, the material may cure with a density of between approximately 5 and 50 lb/ft$^3$. Such density or higher may also be achieved with other polymeric materials.

Referring now to FIG. 6B, in a fifth step 116, the subassembly 114 is removed from the first mold 108. In the subassembly 114, the functional inserts are completely surrounded by the hardened first polymeric material 112, such that the functional inserts are prevented from moving within the subassembly 114. The first polymeric material 112 is not water porous and therefore forms a further seal around the rim supply line 34 and the sump supply line 42, preventing water from leaking out of the subassembly 114 during a flushing sequence. Because the first polymeric material 112 is molded around the functional inserts, the first polymeric material 112 itself provides the structure for holding the functional inserts into position, such that no additional structure is required to hold the functional inserts in place (although, optionally, fasteners could be provided to couple the functional inserts in a desired location prior to the molding operation). According to another exemplary embodiment, where the subassembly 114 does not include functional inserts, channels formed by male portions of the first mold 108 are not water porous and therefore may carry water directly to the flush engine without installing a conduit in the channels.

Figure 7:
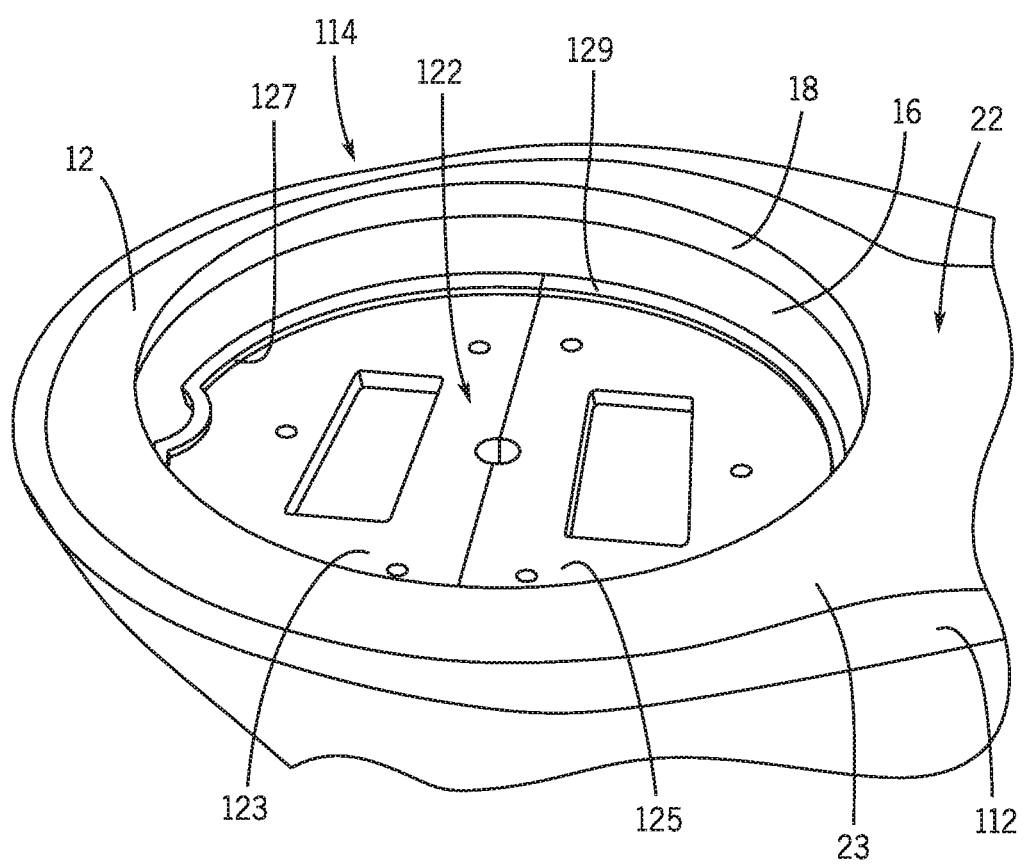
FIG. 7 is a perspective view showing a portion of a rim insert being installed in a foam subassembly.

Referring to FIG. 7, the subassembly 114 is shown according to an exemplary embodiment. As shown in FIG. 7, the first polymeric material 112 extends generally coplanar with the upper surface 22 of the flush engine 12 (e.g., extending laterally outward from the edge 23 of the upper surface 22), but is not disposed on top of the upper surface 22. In this configuration, the application of the first polymeric material 112 does not increase a height of the upper surface 22. The first polymeric material 112 may include a colorant (e.g., approximately 2% colorant), such that the color of the first polymeric material 112 corresponds to the color of the upper surface 22 or other portions of the flush engine 12. In this configuration, the flush engine 12 may not be distinguishable from the first polymeric material 112 based on color alone. According to other exemplary embodiments, the first polymeric material 112 may be disposed on the upper surface 22, such that the first polymeric material 112 defines a desired shape of the upper surface 22.

Figure 8:
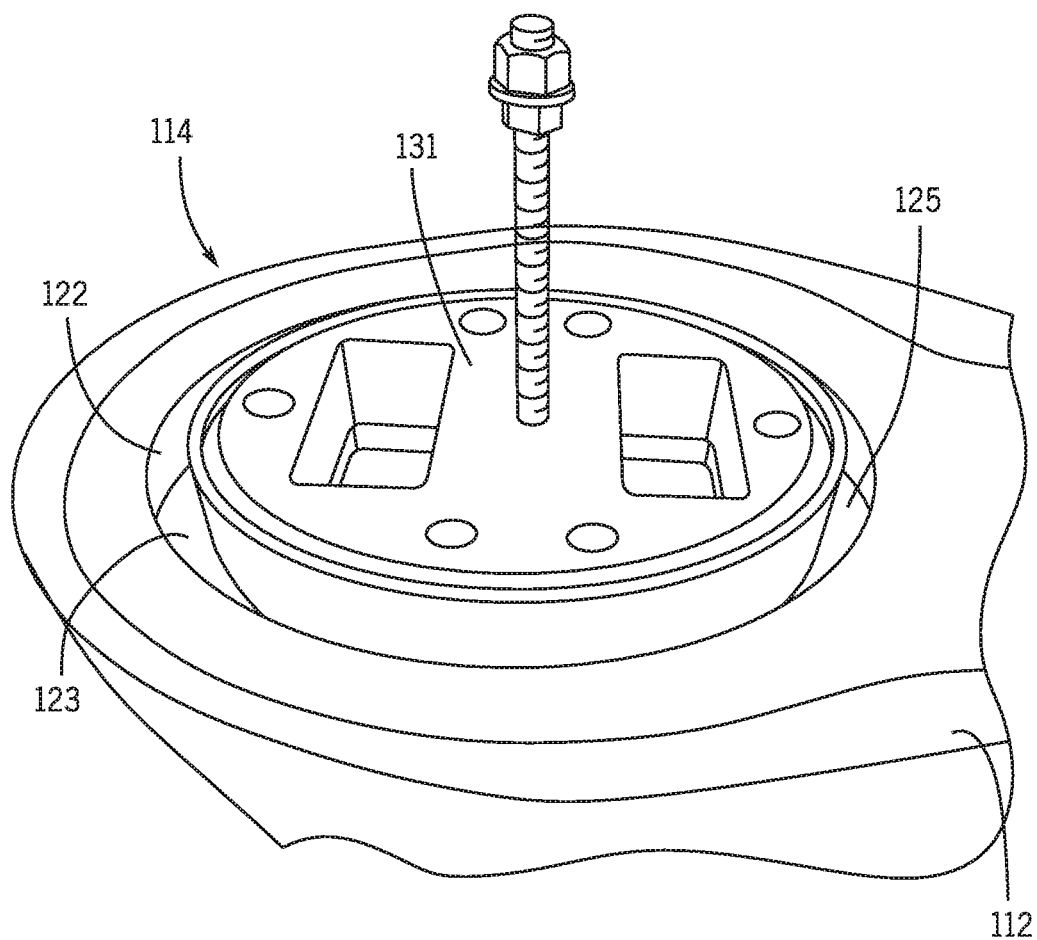
FIG. 8 is a perspective view showing the rim insert of FIG. 7 being installed.

Referring again to FIG. 6B, in a sixth step 118, the subassembly 114 is prepared for insertion into a second mold 120. A rim insert 122 is positioned within the rim 18 of the bowl 16 and is configured to seal the bowl 16 in order to prevent resin from entering the bowl 16 during the injection molding process. FIGS. 7 and 8 show the rim insert 122 being installed in the bowl 16. Referring to FIG. 7, the rim insert 122 includes a first sealing component 123 and a second sealing component 125. The first and second sealing components 123, 125 are configured to be positioned substantially coplanar within the bowl 16, such that an outer periphery 127 of the first sealing component 123 and an outer periphery 129 of the second sealing component 125 cooperate to engage the inner surface of the bowl 16 substantially all the way around. For example, the outer peripheries 127, 129 may define a profile substantially complementary to a profile of the bowl 16 proximate to and below the rim 18. The outer peripheries 127, 129 may form sealing engagement with the inner surface of the bowl 16 and/or with a lower surface of the rim 18. The rim insert 122 includes at least two sealing components 123, 125, such that the sealing components 123, 125 may be separately inserted into the rim 18, which defines a surface area that is smaller than a surface area defined by the combined outer peripheries 127, 129.

Referring to FIG. 8, the rim insert 122 includes a rim insert connector 131 coupled to each of the first and second sealing components 123, 125. The rim insert connector 131 is configured to bring the sealing components 123, 125 into sealed engagement with the bowl 16 and/or the rim 18. The sealed engagement prevents resin from entering into the bowl 16 or other interior portions of the flush engine 12. The rim insert connector 131 may include a member (e.g., threaded rod) configured to be coupled to the second mold 120, such that the rim insert 122 is held in position with respect to the second mold 120 during the molding process and/or the process of inserting the subassembly 114 into the second mold 120.

While FIGS. 6B, 7, and 8 show the rim insert 122 for sealing the bowl 16 during the molding process, according to other exemplary embodiments, the bowl 16 may be sealed in other ways. For example, a diaphragm may be positioned in the bowl similarly to where the rim insert 122 is positioned and then filled until it sealingly engages the inner wall 17 of the bowl 16 or a portion of the rim 18, thereby preventing the resin from passing between the diaphragm and the bowl 16 or the rim 18. According to another exemplary embodiment, the second mold 120 may include one or more male portions that directly and sealingly engage the inner surface 17 of the bowl 16 and/or the rim 18 to prevent resin from passing therebetween. While the rim insert 122 or other structures are discussed with respect to sealing the bowl before introducing a resin, it should further be understood that any of these or other described structures or methods may be used to seal the bowl 16 and/or the rim 18 during the third step 106 in order to prevent the first polymeric material 112 from passing into the bowl 16.

Referring again to FIG. 6B, supports 124 are then removably attached to the rear portion 46 on the subassembly 114, such that the subassembly 114 may hang from the supports 124. For example, the supports 124 may be coupled to the subassembly 114 in the cavities 48. The subassembly is then disposed in a female portion of the second mold 120, such that the forward portion 44 of the subassembly 114 faces down and the rear portion 46 faces up. In this configuration, due to the flow of material due to gravity, if insufficient resin material is provided to the second mold 120, the forward portion 44 and sides of the subassembly 114 will be sufficiently covered with resin, even if the rear surface 50 is not.

The second mold 120 defines a second shape that is the same as a final outer shape of the shell 14. The subassembly 114 may be positioned within the second mold 120, such that a substantially uniform gap is defined between an outer surface of the subassembly 114 and an inner surface of the second mold 120. For example, the gap may be between approximately 0.040 inches and 0.75 inches, or more specifically between 0.125 inches and 0.375 inches. In a seventh step 126, the second mold 120 is closed and a second polymeric material 128 (e.g., a resin) is injected into the female portion of the second mold 120 under pressure, such that the second polymeric material 128 fills in the remaining space in the second mold 120 defined around the subassembly 114. For example, the second polymeric material 128 may cover substantially all of the first polymeric material 112, the upper surface 22 of the flush engine 12, and the rim 18, but may not cover the inner surface of the bowl 16, which is protected by the rim insert 122 during introduction of the second polymeric material 128.

The second polymeric material 128 may be an acrylic, polystyrene (e.g., polyester), urethane, an epoxy composite, or other suitable resin configured to cure as a solid and provide a desired exterior finish to the shell 14. For example, the second polymeric material 128 may be neat or may instead be a filled resin containing up to about 90% filler material. The second polymeric material 128 may be filled with approximately 2% colorant, such that the shell 14 has a colored appearance.

In the seventh step 126, the second polymeric material 128 cures until it is hardened and forms the toilet assembly 10. Referring now to FIG. 6C, in an eighth step 130, the toilet assembly 10 is removed from the second mold 120. The rim insert 122 is removed from the rim 18 and the supports 124 are separated from the toilet assembly 10. After the toilet assembly 10 is removed, in a ninth step 132, the toilet assembly 10 is finished (e.g., polished, sanded, etc.) to provide a smooth finished surface. For example, where the injection molding process leaves a parting line of excess resin where separate portions of the second mold 120 come together, the parting line may be polished or sanded until it is no longer visible.

It should be understood that each first mold 108 and second mold 120 provide a desired outer shape of the toilet assembly 10. For each toilet assembly 10 design, the second mold 120 may correspond with the first mold 108 to provide a substantially constant gap between the foam subassembly 114 formed by the first mold 108 and the inner surface of the second mold 120 when the foam subassembly 114 is positioned therein, thereby providing the layer of second polymeric material 128 having a substantially constant thickness. According to an exemplary embodiment, a variety of first and second molds 108, 120 may be provided with different corresponding mold shapes to provide different final toilet assembly 10 designs. However, each of the first and second molds 108, 120 is configured to receive the same standardized flush engine 12.

While the method shown in FIGS. 6A-8 is directed to a toilet assembly 10 including two polymeric layers overmolded on the flush engine 12, it should be understood that such a process may be used with other plumbing or sanitary fixtures (e.g., toilet tank, bidet, urinal, sink, bath, shower pan, toilet seat, and/or lid, etc.). For example, a standardized tank inner structure, which contains freshwater for flushing, may be used with various toilets having different toilet tank aesthetic designs. The tank inner structure may be formed from vitreous china or other suitable sanitary material as discussed above with respect to the flush engine 12. In the third step 106, the tank inner structure is inserted into the first mold 108 and a foam polymeric layer is applied directly to an outer surface of the tank inner structure. In the sixth step 118, openings in the tank inner structure are sealed in similar ways as the rim 18, described above, and in the seventh step 126, the resin polymeric material is applied to the foam polymeric layer.

Figure 9:
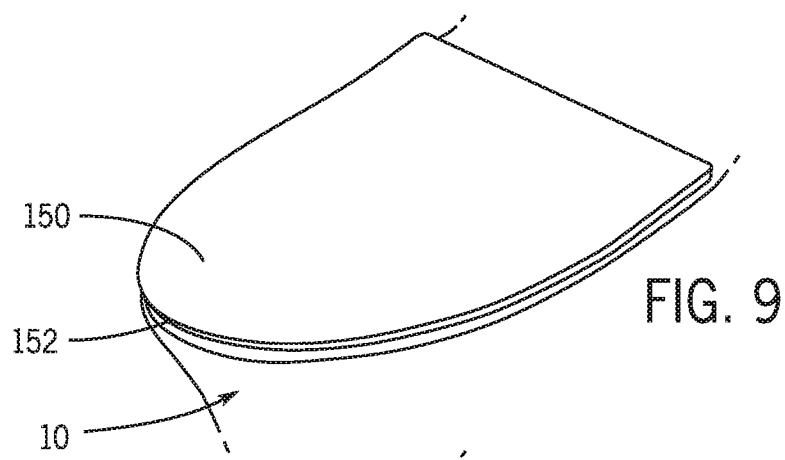
FIG. 9 shows an exemplary embodiment of a toilet assembly with an embedded light source in a non-illuminated condition.
Figure 10:
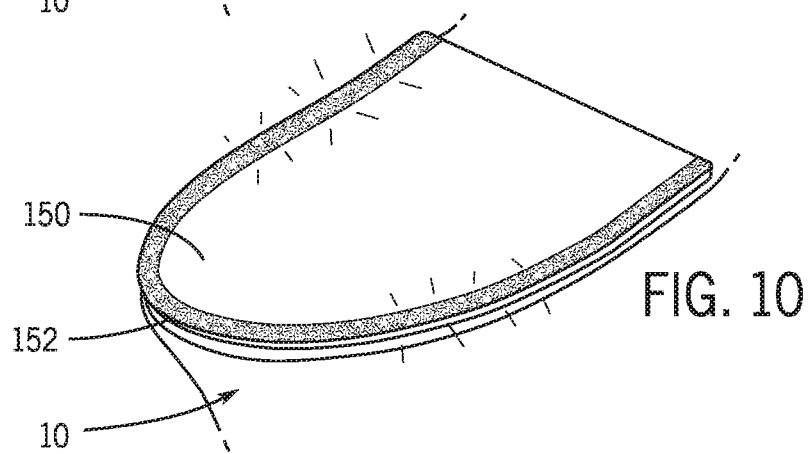
FIG. 10 shows the toilet assembly of FIG. 9 in an illuminated condition.
Figure 11:
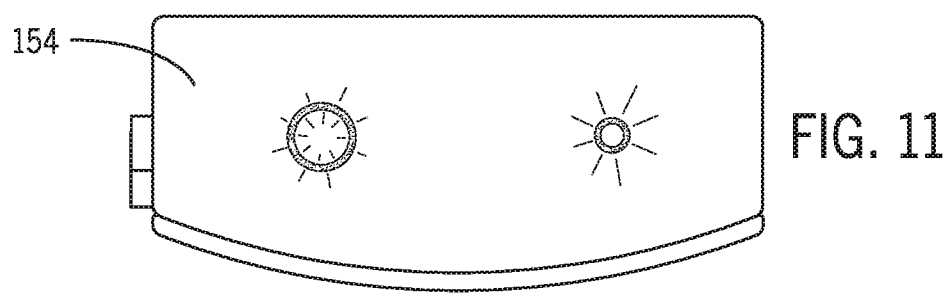
FIG. 11 shows another exemplary embodiment of a toilet assembly with an embedded light source in an illuminated condition.

Referring to FIGS. 9-11, according to an exemplary embodiment, the second polymeric material 128 may be configured to be at least partially translucent, such that light may be transmitted from a light source, through the second polymeric material 128, illuminating portions of the toilet assembly 10. Referring to FIG. 9, portions of a toilet assembly 10 are shown according to various exemplary embodiments. For example, FIG. 9 shows a toilet lid 150 defining an outer periphery 152 and having a resin coating and a light source installed therein and turned to an "off" state. As shown in FIG. 10, a light source is disposed proximate the outer periphery 152 and configured in an "on" state to illuminate the toilet lid 150 at the outer periphery. Such configuration presents a glowing (e.g., halo) effect on the toilet lid 150. According to an exemplary embodiment, the second polymeric material 128 may have enough opacity to conceal the underlying light source from view but to allow light to permeate through the second polymeric material 128.

According to another exemplary embodiment, the light source may be positioned in other locations (e.g., an underside or interior portion) in the toilet lid 150 and reflected and/or refracted toward the outer periphery 152 or other portions of the toilet lid 150, which are desired to be illuminated. In this configuration, the light source may be concealed from view within the toilet lid 150, such that the light illuminates portions of the second polymeric material 128.

According to other exemplary embodiments, the light source may be disposed in other portions of the toilet assembly 10. For example, as shown in FIG. 11, the light source may be disposed on a tank 154 (e.g., at a tank lid or in a tank body), beneath the second polymeric material 128. The tank 154 may include more than one light sources defining different shapes. For example, circles or other shapes having different sizes may correspond to various flush sequences. When a sensor is disposed on the tank 154 or other surface proximate the light source, light passing through the second polymeric material 128 may identify a location for a user to touch in order to control or initiate the flush sequence. While FIG. 11 shows the light source disposed in a toilet lid 150 and a tank 154, according to other exemplary embodiments, the light source may be disposed in various portions of the subassembly 114, such that the light source is concealed from view, but light is passed through the second polymeric material 128. For example, the light source may illuminate portions of a toilet pedestal or portions of other plumbing or sanitary fixtures (e.g., toilet tank, bidet, urinal, sink, bath, shower pan, toilet seat, and/or lid, etc.).

Figure 12:
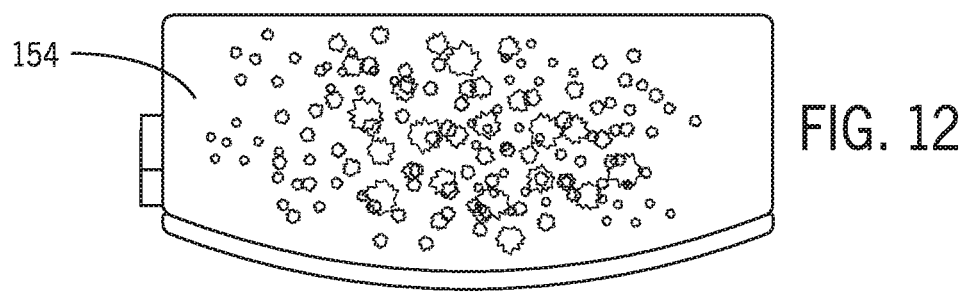
FIG. 12 shows another embodiment of a toilet assembly with an embedded light source in an illuminated condition.
Figure 13A:
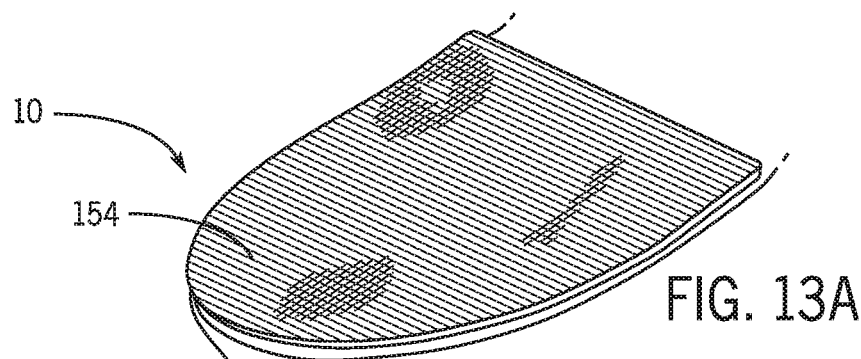
FIG. 13A shows a toilet assembly with textured surfaces according to an exemplary embodiment.
Figure 13B:
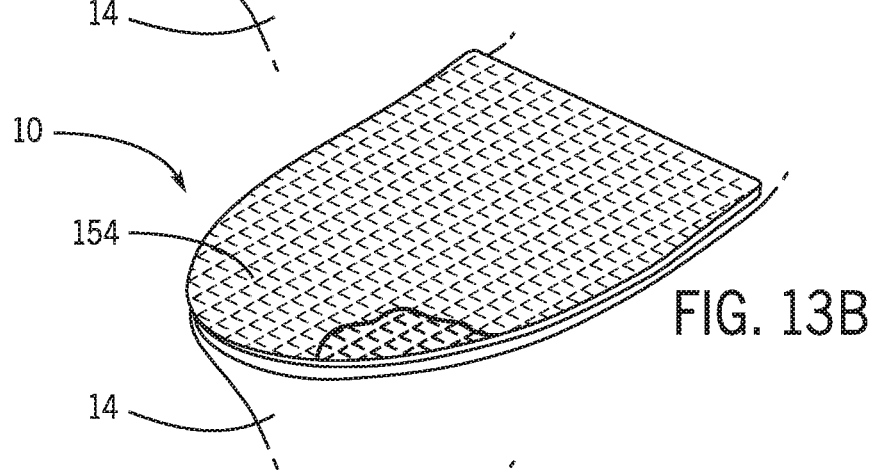
FIG. 13B shows a toilet assembly with textured surfaces according to another exemplary embodiment.
Figure 13C:
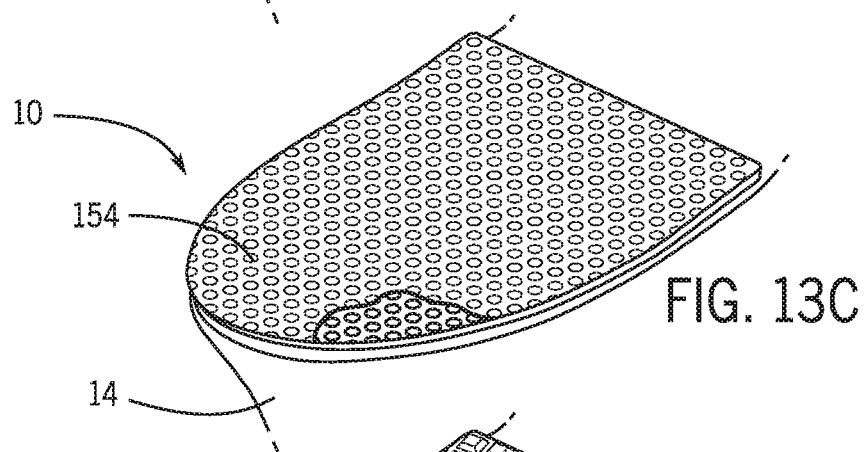
FIG. 13C shows a toilet assembly with textured surfaces according to another exemplary embodiment.
Figure 13D:
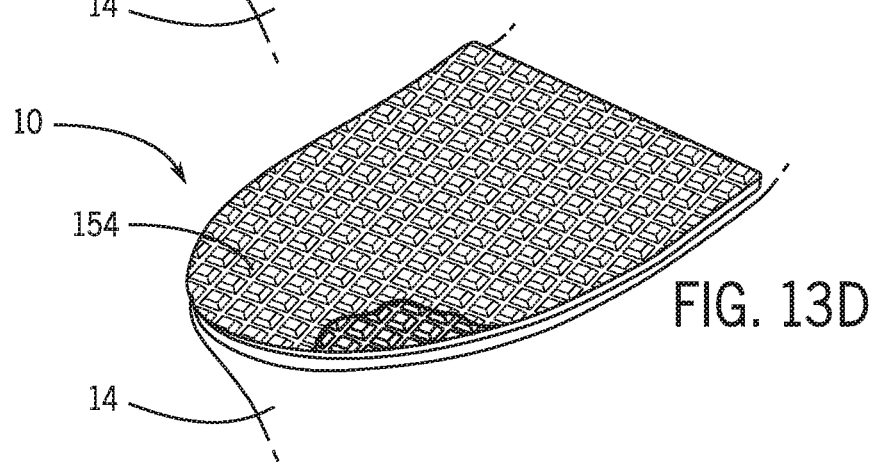
FIG. 13D shows a toilet assembly with textured surfaces according to another exemplary embodiment.

Referring to FIG. 12, the light source may also define more complex patterns (e.g., a constellation as shown in FIG. 12). The light source may output a plurality of colors to display a desired pattern. According to another exemplary embodiment, one or more light sources may perform a lighting sequence (e.g., an animation). For example, the one or more light sources may show the constellation in FIG. 12 moving to provide a desired aesthetic effect. The light source may further illuminate the toilet assembly 10 in the dark, providing a night light feature in the bathroom and help a user identify the location of the toilet assembly 10 without turning on ambient lighting in the bathroom. While FIGS. 9-12 show the toilet assembly 10 having a light source for generating light, according to other exemplary embodiments, the toilet assembly 10 may include a luminescent coating below the second polymeric material 128 and configured to absorb light from an external light source and output the light once the light source is turned off. According to another exemplary embodiment, at least one of the first or second polymeric materials 112, 128 may be embedded with a luminescent material.

Referring now to FIGS. 13A-17, toilet assemblies 10 are shown according to various exemplary embodiments. Specifically, FIGS. 13A-13D show toilet assemblies having a shell 14, as discussed above, and a lid 154. Each of the lids 154 shows an example of a different texture, pattern, or fabric appearance. While FIGS. 13A-17 show different textures or fabrics applied to a lid 154, it should be understood that the following features may be applied to first and second polymeric layers on other plumbing or sanitary fixtures described elsewhere in this application.

Referring now to FIGS. 14, a cross-sectional view of a portion of a plumbing fixture 160 (e.g., the lid 154 of FIGS. 13A-13D or the bowl 16 of FIGS. 2 and 3) is shown according to an exemplary embodiment. The plumbing fixture 160 includes a base structure 162 formed from a sanitary material (as discussed above) having an inner surface 164 and an opposing outer surface 166. In the configuration in which the base structure 162 is formed from vitreous china, the inner surface 164 is glazed and the outer surface 166 may or may not be glazed. A first polymeric layer 168, substantially the same as the first polymeric layer 112 discussed above, is disposed directly on the outer surface 166 of the base structure 162. The first polymeric 168 includes an inner surface 170 and an opposing outer surface 172. The inner surface 170 of the first polymeric layer 168 engages and is disposed directly on the outer surface 166 of the base structure 162 and has substantially the same surface profile. A second polymeric layer 174, substantially the same as the second polymeric layer 128 discussed above, is disposed on the outer surface 172 of the first polymeric layer 168. The second polymeric 174 includes an inner surface 176 and an opposing outer surface 178. The inner surface 176 of the second polymeric layer 174 engages and is disposed on the outer surface 172 of the first polymeric layer 168 and has substantially the same surface profile. According to another exemplary embodiment, at least a portion of the second polymeric layer 174 is disposed directly on the outer surface 166 of the base structure 162.

As shown in FIG. 14, the inner and outer surfaces 164, 166 of the base structure 162 have smooth surface profiles. However, in order to provide a textured appearance for aesthetic purposes, a textured finish may be provided by one or both of the first and second polymeric layers 168, 174. The outer surface 172 of the first polymeric layer 168 includes a textured, non-planar, surface profile providing a textured appearance. This textured outer surface 172 may be formed from corresponding features defined in an inner surface of the first mold 108. The inner surface 176 of the second polymeric layer 174 forms a complementary surface profile and the outer surface 178 of the second polymeric layer 174 forms a substantially smooth, non-textured surface. In this configuration, the texture of the first polymeric layer 168 is visible through the second polymeric layer 174 due to the transparency of the second polymeric layer 168, but a user does not feel the texture.

Referring now to FIG. 15, the outer surface 172 of the first polymeric layer 168 includes a non-textured surface profile providing a smooth appearance, generally defining the outer shape of the plumbing fixture 160. The inner surface 176 of the second polymeric layer 174 forms a complementary smooth surface profile. However, the outer surface 178 of the second polymeric layer 174 forms a textured, non-planar surface. This textured outer surface 178 may be formed from corresponding features defined in an inner surface of the second mold 120. In this configuration, a user may feel the texture of the second polymeric layer 174.

Referring now to FIG. 16, the outer surface 172 of the first polymeric layer 168 includes a textured, non-planar, surface profile providing a textured appearance. This textured outer surface 172 may be formed from corresponding features defined in an inner surface of the first mold 108. The inner surface 176 of the second polymeric layer 174 forms a complementary surface profile. The outer surface 178 of the second polymeric layer 174 forms a textured, non-planar surface, which is complementary to the surface profile of the outer surface 172 of the first polymeric layer 168. For example, the second polymeric layer 174 may have a substantially constant or variable thickness based on the gap between the outer surface 166 of the first polymeric layer 168 and the second mold 120. This textured outer surface 178 may be formed from corresponding features defined in an inner surface of the second mold 120. In this configuration, a user may feel the texture of the second polymeric layer 174.

Referring now to FIG. 17, plumbing fixture 160 is shown with an intermediate layer 180 disposed between the first polymeric layer 168 and the second polymeric layer 174. The intermediate layer 180 includes a fabric or other material overlaid onto at least a portion of the first polymeric layer 168 and/or the base structure 162. The second polymeric layer 174 is then applied over the intermediate layer 180 and the first polymeric layer 168, sealing the intermediate layer 180 between the first and second polymeric layers 168, 174. Where the intermediate layer 180 defines a texture or a pattern, the second polymeric layer 174 may provide either a smooth outer surface 178 or may provide a textured outer surface 178 corresponding to the texture of the intermediate layer 180.

It should be noted that while FIG. 14-17 show the first and second polymeric layers 168, 174 disposed on only the outer surface 166 of the base structure 162, according to other exemplary embodiments, one or both of the first and second polymeric layers 168, 174 may extend fully around the base structure 162 along both the inner surface 164 and the outer surface 166. For example, an underlying base structure 162 of a lid (e.g., as in lid 154 of FIGS. 13A-13D) may be fully surrounded by the first and second polymeric layers 168, 174. Similarly, a intermediate layer 180 may extend around one or both surfaces 164, 166 of the of the base structure 162 in the configuration described with respect to FIG. 17. According to yet another exemplary embodiment, the plumbing fixture 160 may be formed without a base structure 162, such that the first polymeric layer 168 is formed around a mold rather than around the base structure 162.

Figure 18A:
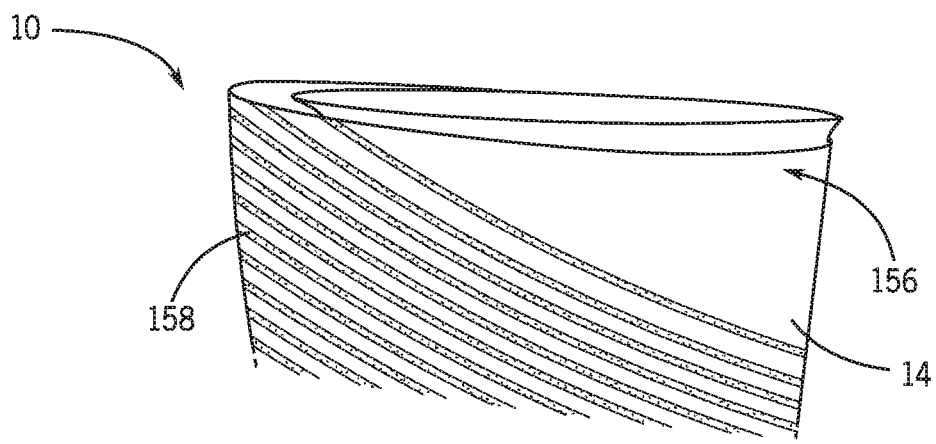
FIG. 18A shows toilet assemblies with surface finishes according to an exemplary embodiment.
Figure 18B:
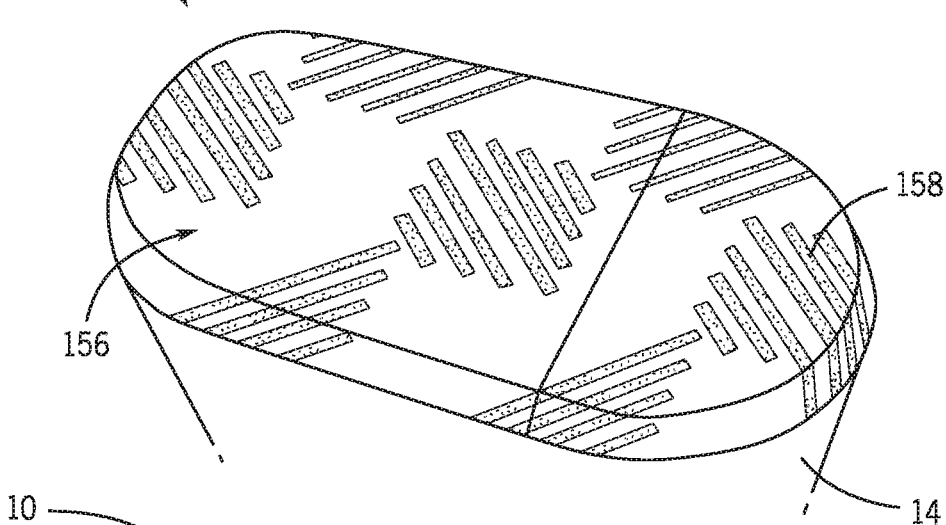
FIG. 18B shows toilet assemblies with surface finishes according to another exemplary embodiment.
Figure 18C:
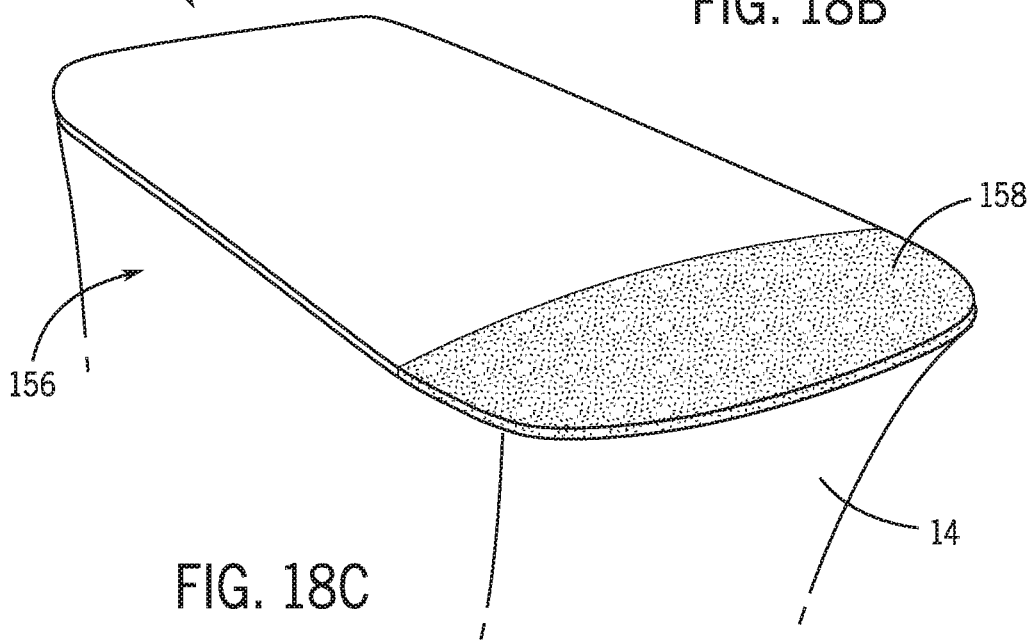
FIG. 18C shows toilet assemblies with surface finishes according to another exemplary embodiment.

Referring now to FIGS. 18A-18C, toilet assemblies 10 are shown having various surface finishes. As shown in FIGS. 18A-18C, the shell 14 may define portions having contrasting finishes (e.g., first portions 156 of the shell 14 may have a generally matte finish and second portions 158 may have a generally glossy or satin finish). During the molding process, portions of the mold may have a matte finish and other portions may have a glossy or satin finish, and the second polymeric layer 128, 174 may take on the characteristics of the mold to create desired patterns or designs.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A toilet assembly comprising:
a flush engine formed from vitreous china, the flush engine comprising:
a bowl;
a sump at a lower portion of the bowl; and
a trapway extending from the sump; and
a shell configured to conceal a portion of the flush engine formed from vitreous china, the shell comprising:
a first polymeric layer at least partially surrounding the flush engine, the first polymeric layer comprising a foam; and
a second polymeric layer provided on the first polymeric layer, the second polymeric layer comprising resin,
wherein:
the first polymeric material extends coplanar with an upper surface of the flush engine; and
wherein the second polymeric material is disposed directly on at least a portion of the upper surface of the flush engine.

2. The toilet assembly of claim 1, wherein the flush engine comprises a glazed inner surface.

3. The toilet assembly of claim 1, wherein the flush engine comprises an unglazed outer surface.

4. The toilet assembly of claim 3, wherein the first polymeric layer is disposed directly on the outer surface of the flush engine.

5. The toilet assembly of claim 1, further comprising:
a rim opening formed proximate a rim of the bowl; and
a rim supply line fluidly coupled to the rim opening and configured to supply water to the bowl;
wherein the rim supply line is disposed in the first polymeric layer.

6. The toilet assembly of claim 5, wherein the rim supply line sealingly engages the rim opening.

7. The toilet assembly of claim 1, further comprising:
a sump opening formed in the sump; and
a sump supply line fluidly coupled to the sump opening and configured to supply water to the sump;
wherein the sump supply line is disposed in the first polymeric layer.

8. The toilet assembly of claim 7, wherein the sump supply line sealingly engages the sump opening.

9. A plumbing fixture comprising:
a base structure formed from vitreous china, the base structure comprising:
an inner surface comprising a sanitary surface configured to be in contact with waste water; and
an opposing outer surface;

a shell configured to conceal a portion of the base structure formed from vitreous china, the shell comprising:
   a first polymeric layer disposed directly on the outer surface, the first polymeric layer comprising a foam; and
   a second polymeric layer provided on the first polymeric layer, the second polymeric layer being at least partially translucent and comprising resin, wherein the second polymeric material is disposed directly on at least a portion of an upper surface of the base structure.

10. The plumbing fixture of claim 9, wherein an outer surface of the first polymeric layer comprises a textured surface profile.

11. The plumbing fixture of claim 10, wherein an outer surface of the second polymeric layer comprises a smooth surface profile.

12. The plumbing fixture of claim 9, wherein the first polymeric material extends coplanar with the upper surface of the base structure.

* * * * *